United States Patent
Hoffman

(10) Patent No.: US 7,348,067 B1
(45) Date of Patent: Mar. 25, 2008

(54) COMPOSITE PAPERBOARDS AND METHOD OF MAKING COMPOSITE PAPERBOARDS

(75) Inventor: Roger P. Hoffman, Green Bay, WI (US)

(73) Assignee: The Hoffman Group, Green Bay, WI (US)

( * ) Notice: Subject to any disclaimer, the term of this patent is extended or adjusted under 35 U.S.C. 154(b) by 1085 days.

(21) Appl. No.: 09/516,648

(22) Filed: Mar. 1, 2000

Related U.S. Application Data

(63) Continuation-in-part of application No. 08/579,219, filed on Dec. 28, 1995, now Pat. No. 5,882,746.

(51) Int. Cl.
*B32B 15/02* (2006.01)
*B32B 31/00* (2006.01)
*D21F 11/00* (2006.01)

(52) U.S. Cl. .................... 428/534; 428/535; 428/536; 156/182; 156/297; 156/306.3; 162/125; 162/126

(58) Field of Classification Search ............... 428/533, 428/534, 535, 536, 337.5, 34.2, 34.3
See application file for complete search history.

(56) References Cited

U.S. PATENT DOCUMENTS

| | | | | |
|---|---|---|---|---|
| 1,374,931 A | * | 4/1921 | Lewis | |
| 2,774,698 A | * | 12/1956 | Jenk et al. | 154/45.9 |
| 3,603,501 A | * | 9/1971 | Confer | 229/51 TS |
| 3,982,056 A | * | 9/1976 | Holder, Jr. | 427/361 |
| 4,237,171 A | * | 12/1980 | Laage et al. | 229/103.11 |
| 4,254,173 A | * | 3/1981 | Peer, Jr. | 428/204 |
| 4,441,626 A | * | 4/1984 | Hall | 229/120 |
| 4,898,752 A | * | 2/1990 | Cavagna et al. | 101/483 |
| 4,913,773 A | * | 4/1990 | Knudsen et al. | 162/129 |
| 5,011,741 A | * | 4/1991 | Hoffman | 162/129 |
| 5,055,161 A | * | 10/1991 | Hoffman | 162/125 |
| 5,178,469 A | * | 1/1993 | Collinson | 383/1 |
| 5,268,348 A | * | 12/1993 | Egashira et al. | 347/221 |
| 5,418,008 A | * | 5/1995 | Calvert | 427/203 |
| 5,492,756 A | * | 2/1996 | Seale et al. | 156/275.5 |
| 5,882,746 A | * | 3/1999 | Hoffman | 206/139 |
| 5,919,575 A | * | 7/1999 | Bowns et al. | 156/228 |
| 6,207,242 B1 | * | 3/2001 | Hoffman | 156/256 |

FOREIGN PATENT DOCUMENTS

JP 07149341 A * 6/1995

OTHER PUBLICATIONS

Mish, Frederick; Webster's Collegiate Dictionary, 1997 (Springfield Massachusetts, Merriam Websters), p. 840.*

* cited by examiner

*Primary Examiner*—Kevin R. Kruer
(74) *Attorney, Agent, or Firm*—Philip M. Weiss; Weiss & Weiss

(57) ABSTRACT

A laminate composite sheet comprising a two-ply base layer comprised of a bottom ply and a top ply, wherein the bottom ply is comprised of unbleached cellulosic fibers and wherein the top ply is comprised of bleached or brightened cellulosic fibers and a further layer attached to the top ply with a layer of adhesive; said further layer having a top and a bottom surface, said further layer selected from the group consisting of paper or film; said layer of adhesive containing no pigment, and said top surface of said further layer having no coating.

24 Claims, 2 Drawing Sheets

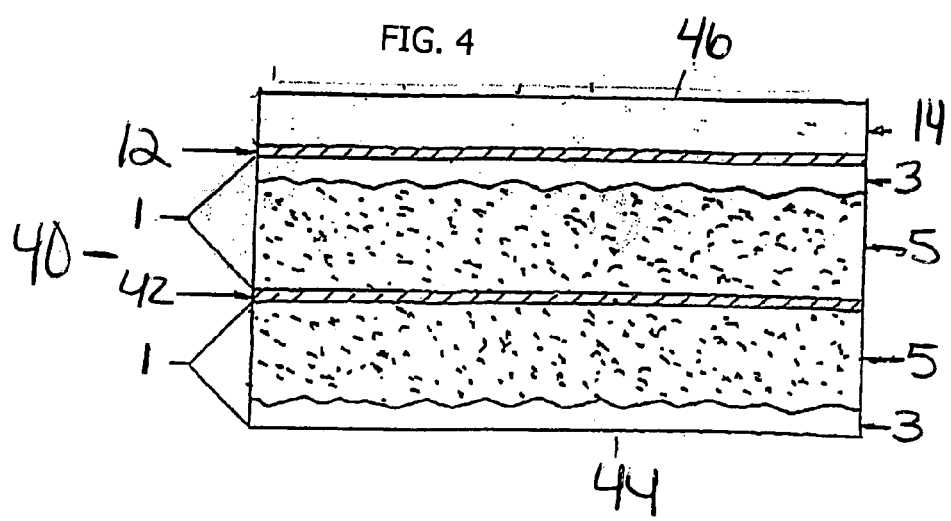
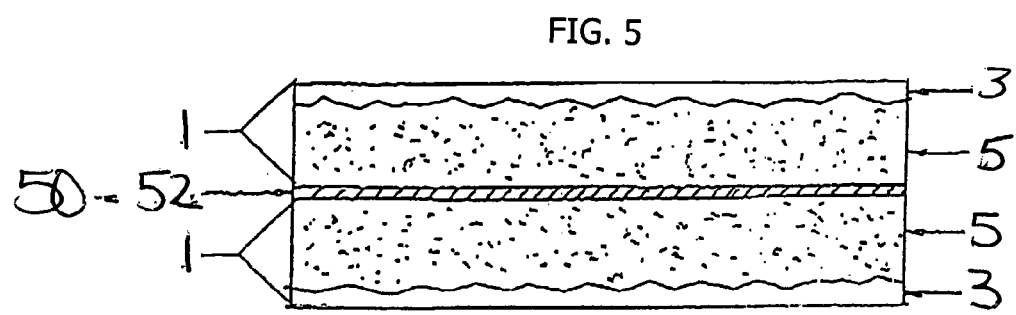

COMPOSITE PAPERBOARDS AND METHOD OF MAKING COMPOSITE PAPERBOARDS

CROSS REFERENCE TO RELATED APPLICATION

This application is a continuation-in-part of Ser. No. 08/579,219 filed Dec. 28, 1995 now U.S. Pat. No. 5,882,746, incorporated herein by reference.

FIELD OF THE INVENTION

This invention relates to paper laminates and a method for preparing paper laminates, and more particularly to paper laminates used for disposable cups, disposable plates, book covers, folding cartons and beverage containers.

BACKGROUND OF THE INVENTION

Paperboard is used every day to create products such as disposable picnic supplies, covers for paperback books, folding cartons and beverage carriers. In the paper industry, the term paperboard refers to heavy papers like board stock. Board stock is a subgroup of paperboard used to make paper cups and plates, hot and cold food containers, ice cream containers, paper back book covers and the like. Box board, a second subgroup of paperboard, is used to make folding cartons such as cereal boxes, beverage carriers, and tissue boxes.

The end use of a product made from paperboard dictates the type of paperboard used. Paperboard characteristics such as cushion, strength, stiffness, wear resistance, coefficient of friction, density, caliper, color, brightness and smoothness are generally considered. In applications where enhanced printed graphics on the product is critical, characteristics such as smoothness and brightness are most important.

Typically, when smoothness and brightness are the desired paperboard characteristics, a solid white paperboard is used. This white paperboard, commonly referred to as Solid Bleached Sulfate, is produced from bleached pulp and used for many of the aforementioned purposes. Though bleached paperboard characteristics contribute to improved printed images, it is considerably more costly to produce and lacks the strength of an unbleached paperboard, and does not provide an ideal surface on which to print high quality graphics.

Other paperboards are even less desirable for printing high quality graphics than Solid Bleached Sulfate paperboard. For instance, unbleached boards have surfaces that are relatively rough or uneven. Unless certain manufacturing processes like clay coating the paper surface or bleaching the pulp are employed, the paperboard surface normally has a gray or brown color. Printing directly on a dark color of the unbleached board provides poor visual contrast for the printed image. Thus, folding cartons used for protecting cosmetics, luxury items, or paperback covers often display a very high quality graphic image that requires use of a higher quality paperboard than has been bleached and/or clay coated.

The prior art discloses a laminated package used for beverage carriers. The prior art discloses a sheet or web of clay-coated or other publication paper that is printed with graphics and stored for subsequent application to a cellulosic substrate. The cellulosic substrate generally consists of one or more plies of unbleached virgin kraft pulp. At the paperboard converting manufacturing site, the coil printed paper is unwound and bonded to a surface of the moving cellulosic substrate with an adhesive to provide a laminated material used to make packages. However, since the thin layer of paper is relatively translucent, the dark colored cellulosic substrate may show through the printed paper and detracted from the appearance of the graphics. To prevent "show-through", finely divided particles of generally inert white pigment, such as calcium carbonate or titanium dioxide are incorporated in the adhesive, or alternatively, a second clay coat is applied to the undersurface of the paper prior to bonding the paper to the substrate.

SUMMARY OF THE INVENTION

Accordingly, it is an object of the present invention to provide a laminated composite sheet whereby it may be unnecessary to add a pigment to the adhesive layer or a coating to the publication grade paper adhesively attached to an unbleached cellulosic substrate. Another object of the invention is to provide a laminated structure where the base board is comprised of at least two-plies one of which is comprised of bleached cellulosic fibers for the purpose of providing a replacement for Solid Bleached Sulfate white paperboard and at least one other ply of unbleached fibers. A ply refers to a layer of cellulosic fiber which is bonded to at least one other layer of cellulosic fiber at the wet-end of the paper machine. Such plies are pressed together in the press section of the papermachine and are subsequently dried together, thus forming a single web of paper or board. One common example of such board is whitetop or mottled-white linerboards. These boards are used to make white corrugated containers. The corrugated container and related linerboard is a very separate and different industry from boxboard and paperboard products. Such differences makes it non-obvious and novel to use such boards for paperboard and boxboard applications. Yet another object of the invention is to provide a laminated composite sheet used to make products that will come in contact with moist, oily or odorous products. The adhesives used in the laminating can provide an oil barrier to prevent such oils from degrading the quality of the printed carton. The adhesive oil barrier is a cost effective substitute to the requirement of an expensive coating operation that exists with the prior art to protect the printed image from oil migration.

A further object of the invention is to provide a laminated composite sheet that has a higher stiffness, tensile strength and tear strength than an unlaminated solid bleached cellulosic board of the same caliper.

One component of a laminated composite sheet is a two-ply base layer comprised of a bottom ply and a top ply. The base layer is formed on a papermaking machine having two wires wherein each ply is formed on a separate wire and conjoined. The top ply is comprised of cellulosic fibers such as bleached or brightened virgin pulp, either mechanically produced or chemically produced, which is provided by the first head box. The benefit of using mechanical pulp is its high opacity for minimizing show through of the darker bottom ply. The bottom ply is comprised of unbleached cellulosic fibers such as unbleached virgin kraft pulp or unbleached recycled pulp provided by the second head box. Because the plies are formed on the same papermaking machine, no adhesive is needed to bond the bottom ply and the top ply together.

In one aspect of the invention, a paper or film substrate is attached to the top ply with a layer of adhesive to form an interlaminate board. The paper substrate may be very thin, such as MG paper, since the top ply is relatively bright. This relative brightness of the top ply can make it unnecessary to add a pigment to the adhesive layer or coating to the top ply of the paper sheet to achieve the required brightness of the board. In addition to MG paper, the paper sheet may be a publication or lable paper or other printing and writing grades of paper.

Similarly a clear or pigmented film substrate, such as polyester, poly-ethylene or poly-propylene film can be added. This film can provide tear resistance, such as bi-oriented poly-propylene or polyester and may have pigments (such as clay or titanium dioxide) in it or pigments, in the adhesive used to secure the film to the board. These pigments can be used to increase the brightness of the surface. Because the outer ply of the board is bleached or brightened fibers, very little pigment in adhesive is necessary to obtain a very bright board surface. An example is a film attached by a white adhesive to a white board. This is contrary to the prior art, where films are secured to a board that is not bleached or does not have bright fibers. Even with significant pigment the required brightness cannot be achieved. Without these pigments, such laminated composite structures would be no brighter than the outerlayer of the board substrate, as the film is clear. The use of tear resistant film allows for a caliper and basis weight reduction in the packaging, further enhancing the logistics and economics of such embodiment. The film can also have properties that provide for the requisite coefficient of friction and gloss characteristic. The film can be reverse printed or forward printed.

Laminating a smooth and relatively thin grade paper to a rough surface would somewhat diminish the high quality image printed on the grade paper. Thus, the top ply of the board structure may also have an enhanced smoothness. In some instances, it may also be desirable that the paper sheet have an additional coating and/or supercalendar to enhance smoothness.

In some applications, it may be desirable to include another layer of board, newsprint or other groundwood papers, or unbleached kraft paper on the interior. This additional laminated layer can provide many benefits including moisture absorption, additional tear strength and stiffness. Hereafter, such layer shall be referred to as a moisture-absorbent layer. The moisture-absorbent layer of paper or board attached to the unbleached bottom paper or board ply of the interlaminate board using a layer of adhesive. This adhesive may be used as a barrier for moisture, oil and odor. The addition of such additional moisture-absorbent laminated board to the interlaminate board enhances the stiffness and strength of the board. This board structure is herein referred to as interlaminate B-board.

In another aspect of the invention, a laminated sheet has a pair of two-ply interlaminated boards, each having a first layer and a second layer comprised of a bottom ply and a top ply, the top ply having bleached or brightened fibers formed on the papermaking machine as previously described. An adhesive layer is disposed between the base unbleached layer so that the bottom unbleached plies of each interlaminate board are adhered together, leaving the bleached or brightened top plies visible on each side of the composite board. The adhesive layer serving to bond the first and second layers together may also act as a barrier for moisture, oil or odor. Further, the top plies have an enhanced smoothness to allow printing directly thereon, or to enhance the smoothness and brightness, allowing the use of a relatively thin grade of paper selected from the group comprising coated and uncoated groundwood, and coated and uncoated free sheet grades, including lable grades. The paper may be laminated on either one or both of the visible bleached or brightened top plies. This board is referred to herein as dual interlaminate board, if it has a laminated paper on both of the top plies. If only one of the top plies has paper laminated to it, the composite board is referred to as the composi-interlaminate board. If the board does not have any paper laminated to the top plies, it is referred to herein as composi-board. Film can be submitted for paper for the reasons indicated above in the discussion of the embodiment called interlaminate board.

It is an object of the invention to provide a method for forming a laminated composite sheet comprising: preparing a top ply comprised of bleached or brightened cellulosic fibers. Preparing a bottom ply comprised of unbleached cellulosic fibers. The two plies are then pressed together in a press section of a papermachine to form a two-ply base layer. A further layer is attached with an adhesive to the top ply; the further layer selected from the group consisting of paper or film. The adhesive contains no pigment. In a further embodiment the method comprises adding an additional layer of paper or board to the bottom ply with a second adhesive layer.

In a further embodiment, the method of forming a laminated composite sheet comprises adding a second two ply base layer. The second two ply base layer comprised of a bottom ply and a top ply; wherein the bottom ply is comprised of unbleached cellulosic fibers and wherein said top ply is comprised of bleached or brightened cellulosic fibers. The bottom ply of the second two-ply base layer is attached to the bottom ply of the two-ply base layer with a second layer of adhesive.

In a further embodiment, the method of comprises attaching to the top ply of the second two-ply base layer with a layer of adhesive, a layer selected from the group consisting of paper or film; the adhesive containing no pigment.

It is a further object of the invention to provide a method for forming a laminated composite sheet comprising: preparing a pair of two ply base layers comprised of a bottom ply and a top ply. The top ply is comprised of bleached or brightened cellulosic fibers. The bottom ply is prepared with unbleached cellulosic fibers. The two plies are pressed together in a press section of a papermachine to form a two-ply base layer. The base layer are attached together with an adhesive. The base layers being attached by the bottom plies so that the top plies remain visible.

BRIEF DESCRIPTION OF THE DRAWINGS

FIG. 4 is a cross-sectional elevation illustrating an embodiment of the present invention referred to as composi-interlaminate board; and FIG. 5 is a cross-sectional elevation illustrating an embodiment of the present invention referred to as composi-board.

DETAILED DESCRIPTION OF THE INVENTION

All of the embodiment of the present invention have a common component, a two-ply base layer 1. The two-ply base layer 1 is formed on a papermaking machine having two wires described herein. The top ply is made from pulp stock consisting of dyed virgin pulp, dyed recycled pulp, bleached virgin pulp or bleached recycled pulp, or any combination thereof. The top ply is generally thinner than the bottom ply, which is comprised of unbleached virgin kraft pulp, unbleached recycled pulp or a combination thereof. Once the two-ply base layer 1 is formed and dried, it is used to create several embodiments of the present invention, namely interlaminate board, interlaminate B-board, composi-interlaminate board, dual-interlaminate board or composi board. Various embodiments of the present invention have high quality graphics and may be used to create point-of-purchase displays, disposable cups, plates and bowls, book covers, folding cartons or beverage carriers.

The paper web supported by the single felt is transferred to a first dryer section. At this point, the web of paper is strong enough to support its own weight and can continue unsupported by a felt into the dryer section. The web comes in direct contact with polished surfaces of numerous dryer rollers in the dryer section, which imparts additional smoothness and varying degrees of gloss on the web.

Figure 1:
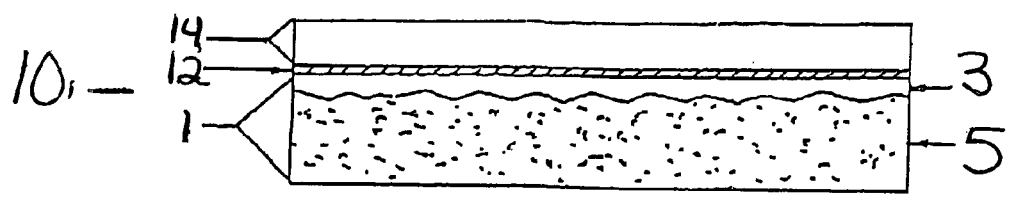
FIG. 1 is a cross-sectional elevation illustrating an embodiment of the present invention referred to as interlaminate board.

FIG. 1 illustrates a first embodiment of the present invention, the interlaminate board 10. The interlaminate board 10 is comprised of three separate components: the two-ply substrate 1 made on one paper machine, a continuous layer of adhesive 12 and a layer of paper or film 14. The layer of paper or film 14 can be white or colored and can be coated or uncoated. The two ply substrate 1 has a first ply 3 and a second ply 5. The top ply 3 which is composed of dyed or bleached, virgin or recycled pulp. Bottom ply or brown ply 5 is composed of unbleached cellulosic fibers such as unbleached virgin kraft pulp or recycled pulp. The unbleached bottom ply 5 can be substantially thicker than the bleached or dyed top ply 3. The basis weight of top ply 3 is typically in the range of about 4 to 20 lbs per 1,000 sq. feet and is dependent upon the quality of the furnish, and the degree of brightness needed to prevent the show-through of the bottom ply 5. A common grade of this base board is white-top or moddled white linerboard. The layer of adhesive 12 is applied to a surface of top ply 3. The adhesive 12 preferably has the characteristics of providing a continuous bond between the paper 14 and substrate 1 and resist delamination. Further, the adhesive 12 may be used as a barrier against the transfer of moisture, oils, odors or the like. It is important that the adhesive 12 does not impregnate either the paper 14 or top ply 3, thereby causing them to be relatively transparent. Such adhesives would defeat a purpose of the present invention because a darker bottom ply would decrease the brightness of the graphics printed on paper or film 14. Paper or film 14 is preferably a coated grade paper capable of supporting high quality graphics. The benefits of the white ply is to put a light basis weight paper or film over it. Such paper 14 may be coated in order to enhance its smoothness, and therefore printability. Such paper can be printed before the lamination process to provide higher quality and more economical printing processes (either in an in-line process that has subsequent laminating or in a separate process) or the board can be printed after the lamination process, either in-line with laminating or in a subsequent operation. Film 14 could be polyethylene or polypropylene films. Such films could provide tear resistance. Such films could have pigments to enhance brightness of the printing surface. Such films could be secured with pigmented adhesives to enhance the brightness of the printing surface. This embodiment is particularly useful for products such as cereal boxes, Kleenex boxes, beverage carriers, or any other application where the interior side of the package may be unbleached.

Figure 2:
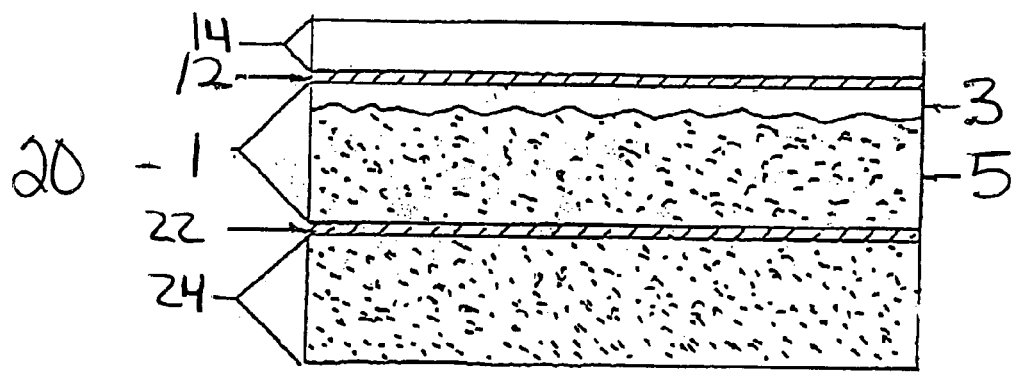
FIG. 2 is a cross-sectional elevation illustrating an embodiment of the present invention referred to as interlaminate B-board.

The invention shown in FIG. 2 is an interlaminate B-board 20. Interlaminate B-board 20 has the same initial structure as described for interlaminate board 10 with two additional elements, namely an adhesive layer 22 and a moisture-absorbent layer 24 of paper or board. The moisture-absorbent layer 24 is adhesively attached to a surface of bottom ply 5 using a continuous layer of adhesive 22. Because moisture-absorbent layer 24 is used to absorb moisture including perhaps even oils, it is important that the adhesive layer 22 does not become impregnated into layer 24 and thereby decrease the moisture absorbing capability thereof. Appropriate adhesives 22 include hot melt glues or glues that are moisture and/or oil resistant. Preferably, a moisture or oil resistant adhesive is used to prevent migration of moisture or oils from layer 24 through the two-ply base layer 1 and ultimately to paper 14. This embodiment of the invention is particularly useful for frozen foods, containers on which condensation may form thereon, or the like. Further, the moisture-absorbent layer 24 may be thick enough to also provide cushioning to any object packaged using the interlaminate B-board 20. The three substrate structure (paper, board with a bleached or brightened ply and the absorbent board or paper) also provides enhanced stiffness and tear resistance due to the multi-laminated structure.

Figure 3:
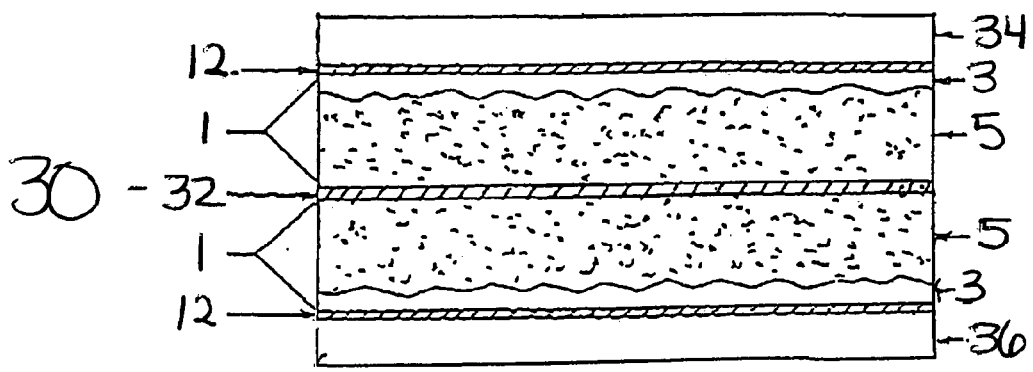
FIG. 3 is a cross-sectional elevation illustrating an embodiment of the present invention referred to as dual-interlaminate board.

The embodiment of the present invention shown in FIG. 3 is the dual-interlaminate board 30. Dual-interlaminate board 30 is comprised of two interlaminate boards 10 adhesively attached at the surface of each of the bottom ply 5 using a layer of adhesive 32. Exposed surfaces 34 and 36 may appear as a plain publication grade paper, such as MG or MF or other printing, writing or table grades, or may have printed graphics thereon or may be films. Because it would be undesirable to contain or use this laminate against any moist or oily products, it is irrelevant whether adhesives 12 and 32 are resistant to such substances. Moisture oily products would likely leave spots, stains or raised patches on either surface. However, it may be desirable that at least one of the adhesive layers 12 or 32 be such that it blocks any type of odor emanating from a product contained within a package constructed from the dual-laminated board 30. This particular embodiment of the present invention is useful for paperback book covers, perfume boxes, gift boxes or any type of container or sheeting where it is desirable to have graphics, publication grade paper or generally enhanced brightness on either side, exposed on each surface.

The embodiment of the present invention shown in FIG. 4 is a composi-interlaminate board 40. Composi-interlaminate board 40 is constructed using interlaminate board 10 and two additional elements, namely adhesive layer 42 and a two-ply base layer 1. As previously described, the two ply base layer 1 is comprised of a top ply 3 and a bottom ply 5. The bottom ply 5 of base layer 1 is attached to the bottom ply 5 of the interlaminate board 10 at its surface using a continuous layer of adhesive 42. Thus, at the surface 44 of bleached top ply 3 is exposed and at surface 46, the paper or film 14, with or without printed graphics, is likewise exposed. As with the dual-interlaminate board 30, it is doubtful that moisture oily products will be in contact with either surface to preserve the appearance of each surface. Thus, it is not necessary for adhesives 12 and 42 to be moisture or oil resistant. However, as with the dual-interlaminate board 30 it may be desirable to block odors using at least one of the layers of adhesive 12 or 42. This embodiment is particularly useful for products such as Kleenex boxes, food boxes, high end packaging for cosmetics and the like. The surface 46 would be used as the exterior of the package, and surface 44 as the interior.

The embodiment of the present invention shown in FIG. 5 is a composi-board 50. Composi-board 50 does not incorporate the interlaminate board 10 like the embodiments shown in FIGS. 1-4. Instead, composi-board 50 is comprised of two, two-ply base layers adhesively attached at the surface of each bottom ply 5 using a continuous layer of adhesive 52. A surface of top ply 3 is exposed. To preserve the appearance of such surfaces, it is unlikely that products containing moisture or oil will be used in conjunction with composi-board laminate 50. However, as before, adhesive layer 52 may be used to block odors. Since the embodiments described in FIGS. 3, 4 and 5 all have enhanced brightness interiors, these products provide for an alternative to solid-bleach sulfate board. These alternatives can provide for greater strength and lower cost substitutes to solid bleached boards. Alternatively, these embodiments provide for an enhanced interior for applications currently using unbleached boards for folding cartons and beverage carriers. The most common type of unbleached board used in folding cartons is Solid Unbleached Sulfate (SUS). The embodiments in FIGS. 3, 4 and 5 can provide for equal or greater strength with lower cost manufacturing, while at the same time providing a white or bright interior (compared to SUS which has a clay coating on one side (the outside of the folding carton) with a brown interior on the inside (the unbleached kraft side).

All of the embodiments of the present invention may be comprised of virgin or recycled materials. Because recycled materials inherently have a lower stiffness, tear strength, and other desirable strength properties, it is quite beneficial that these recycled fibers are used in a laminate form, as laminates typically have greater strength and stiffness characteristics when compared to prior art paperboards of equal caliper.

It is important to note that virgin pulp used to make two-ply board may be made using either a chemical or mechanical pulping process. In the chemical process, the pulp is cooked and the majority of lignin is removed from the pulp. This results in finely translucent pulp fibers. In the mechanical process, wood is ground into pulp. This process does not remove lignin so the pulp fibers are more opaque. Though this process is less expensive, paper made from such lignin-containing pulp tends to yellow with exposure to light and air. Because the top ply 3 of the two-ply base layer is covered with publication paper 14 in several of the above mentioned embodiments, yellowing of ply 3 would not be noticeable and may not occur. Thus, it is desirable to use the less expensive mechanically processed virgin pulp for the top ply 3 furnish. The outer ply can also be made from recycled fibers, such as deinked and potentially bleached fibers processed from fiber such as mixed office waste.

The composite paperboards of each embodiment are intended to be used as substitutes for existing paperboards. Thus, other processes may be applied to each of the embodiments. These include additional laminating, printing, foil stamping, dye cutting, scoring, folding, gluing and the like to create cartons, beverage carriers and other paperboard products with optional graphic images thereon. This additional processing may take place while the composite board is in a web form, or after it is cut into sheets. Additionally, a varnish or other such coating may be applied to the surface of one or both sides of the board, to add decoration or protect the surface of the board and graphic images. Typically, such varnish coatings are used to protect the surface of cartons used, particularly for items that receive an inordinate amount of potential surface wear and abrasion. These include, beverage carriers, paperback novels, and other products that are exposed to a significant amount of handling either in shipping or in use.

The invention claimed is:

1. A laminate composite sheet comprising:
   a two-ply base layer comprised of a bottom ply and a top ply, wherein the bottom ply is comprised of unbleached cellulosic fibers and wherein the top ply is comprised of bleached or brightened cellulosic fibers;
   a further layer attached to the top ply with a layer of adhesive; said further layer having a top and a bottom surface, said further layer selected from the group consisting of paper or film; said layer of adhesive containing no pigment, and said top surface of said further layer having no coating.

2. The composite sheet of claim 1 wherein said bottom ply is thicker than said top ply.

3. The composite sheet of claim 1 wherein the top ply has a brightness of above 60 ISO.

4. The composite sheet of claim 1 wherein the paper sheet is a publication grade paper.

5. The composite sheet of claim 1 wherein said film is a tear resistant film.

6. The composite sheet of claim 1 wherein said film is reverse printed.

7. The composite sheet of claim 1 further comprising a second two-ply base layer comprised of a bottom ply and a top ply, wherein the bottom ply is comprised of unbleached cellulosic fibers and wherein the top ply is comprised of bleached or brightened cellulosic fibers;
   said bottom ply of said second two-ply base layer attached to the bottom ply of said two-ply base layer with a second layer of adhesive.

8. The composite sheet of claim 7 further comprising a layer attached to the top ply of said second two ply base layer with a layer of adhesive; said layer having a top and a bottom surface, said layer selected from the group consisting of paper or film; said layer of adhesive containing no pigment, and said top surface of said layer having no coating.

9. The composite sheet of claim 1 wherein said unbleached cellulosic fibers are selected from the group consisting of unbleached virgin kraft pulp and unbleached recycled pulp.

10. The composite sheet of claim 9 wherein the adhesive is a barrier for moisture, oil and odor.

11. The composite sheet of claim 1 wherein the paper sheet has a coating.

12. The composite sheet of claim 11 wherein the coating is selected from the group consisting of clay, protein, starch, Titanium Dioxide, or mixtures thereof.

13. The composite sheet of claim 1 wherein said film contains a pigment.

14. The composite sheet of claim 1 further including an additional layer of paper or board attached to said bottom ply with a second adhesive layer.

15. The composite sheet of claim 14 wherein said additional layer is comprised of unbleached cellulosic fibers selected from the group consisting of unbleached virgin kraft pulp and unbleached recycled pulp.

16. The composite sheet of claim 14 wherein said second adhesive layer is selected from the group consisting of hot melt glues or glues that are moisture and/or oil resistant.

17. The composite sheet of claim 14 wherein said additional layer is a moisture absorbent layer.

18. The composite sheet of claim 17 wherein the second adhesive layer is not significantly absorbed by the moisture absorbent layer, and the second adhesive layer acts as a moisture barrier.

19. A laminated composite sheet comprising:
- a pair of two-ply base layers, comprised of a bottom ply and a top ply, wherein the bottom ply is comprised of unbleached cellulosic fibers and wherein the top ply is comprised of bleached or brightened cellulosic fibers; and
- an adhesive layer is disposed between the base layers, serving to adhere the bottom plies of each base layer together so that the top plies remain visible.

20. A method for forming a laminated composite sheet comprising:
- preparing a top ply comprised of bleached or brightened cellulosic fibers;
- preparing a bottom ply comprised of unbleached cellulosic fibers;
- pressing together in a press section of a papermachine said top ply and said bottom ply to form a two-ply base layer;
- attaching a further layer with an adhesive to said top ply; said further layer selected from the group consisting of paper or film; said adhesive containing no pigment and said top surface of said further layer having no coating.

21. The method of claim 20 further comprising:
- adding an additional layer of paper or board to said bottom ply with a second adhesive layer.

22. The method of claim 20 further comprising;
- adding second two ply base layer: comprised of a bottom ply and a top ply;
- wherein the bottom ply is comprised of unbleached cellulosic fibers and wherein said top poly is comprised of bleached or brightened cellulosic fibers;
- attaching said bottom ply of said second two-ply base layer to said bottom ply of said two-ply base layer with a second layer of adhesive.

23. The method of claim 22 further comprising:
- attaching to said top ply of said second two-ply base layer with a layer of adhesive, a layer selected from the group consisting of paper or film; said adhesive containing no pigment.

24. A method for forming a laminated composite sheet comprising:
- preparing a pair of two ply base layers comprised of a bottom ply and a top ply;
- preparing said top poly comprised of bleached or brightened cellulosic fibers
- preparing a bottom ply comprised of unbleached cellulosic fibers;
- pressing together in a press section of a papermachine said top ply and said bottom ply to form a two-ply base layer;
- attaching said base layers together with an adhesive;
- said base layers being attached by said bottom plies so that the top plies remain visible.

* * * * *